(No Model.) 2 Sheets—Sheet 1.
J. C. FERGUSON.
STONE SAWING MACHINE.
No. 410,585. Patented Sept. 10, 1889.
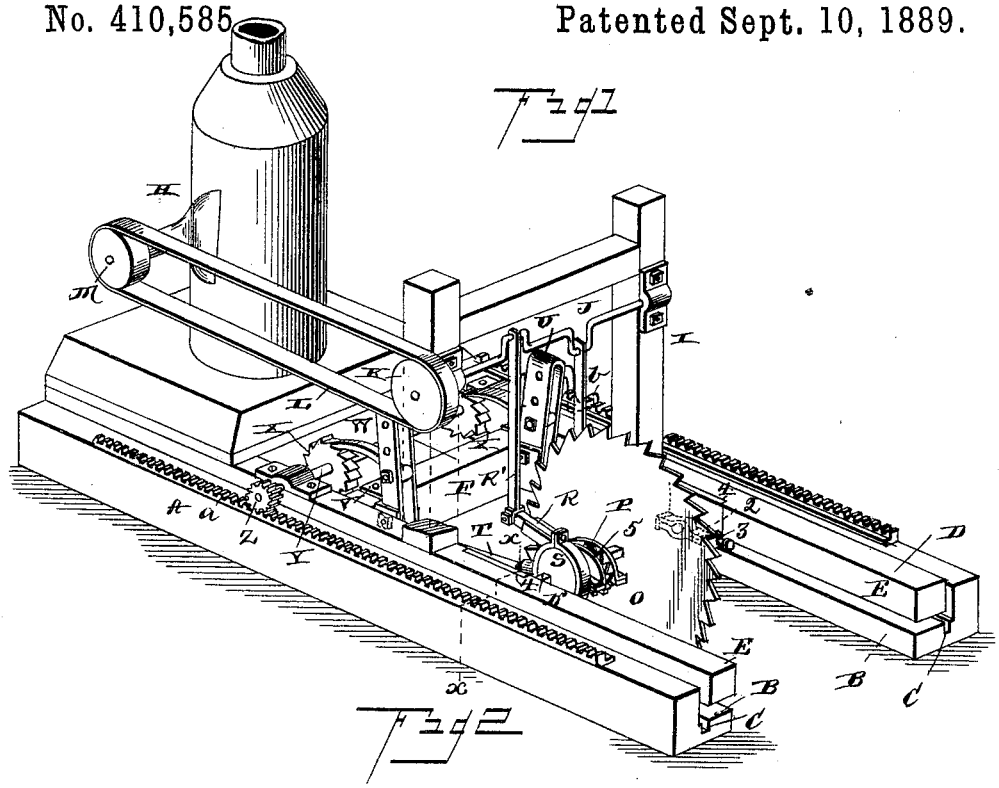
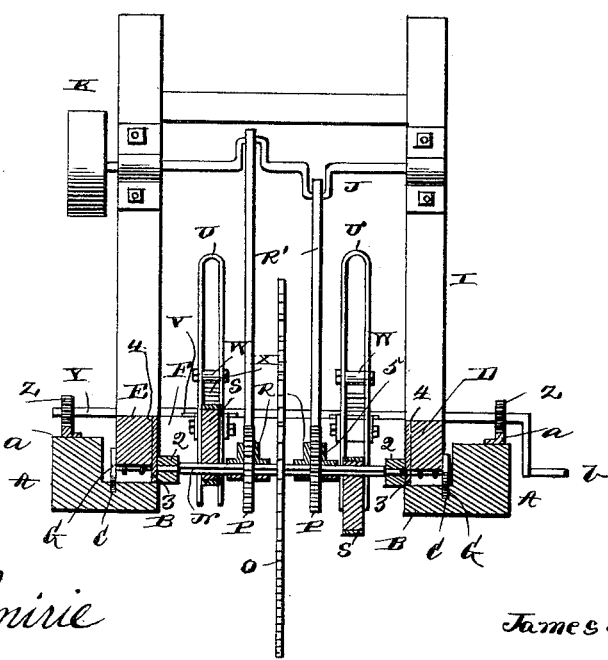
Witnesses
John Imirie
R. W. Bishop.
Inventor
James C. Ferguson
By his Attorneys

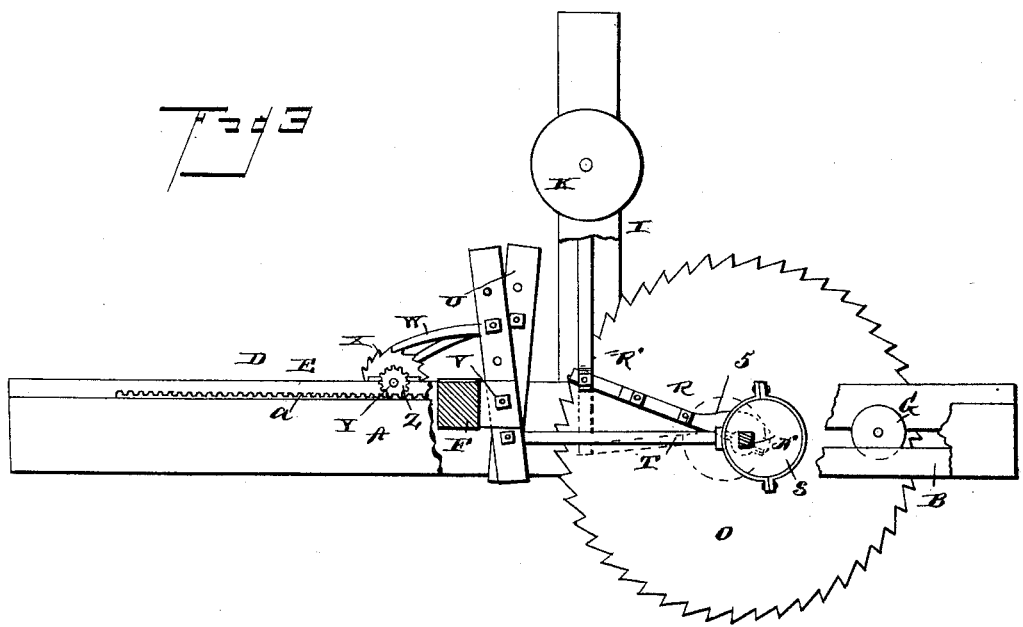
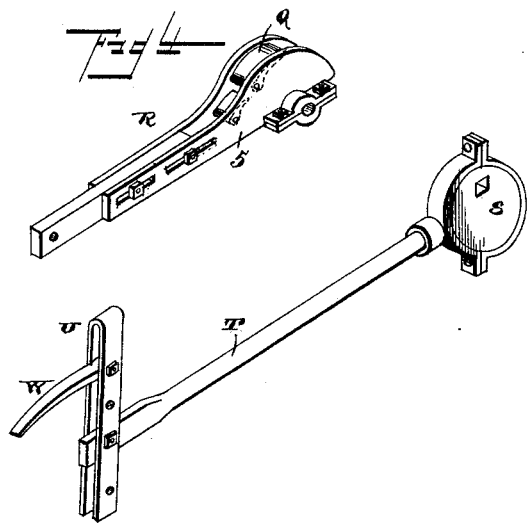

UNITED STATES PATENT OFFICE.

JAMES CRAWFORD FERGUSON, OF BELTON, TEXAS.

STONE-SAWING MACHINE.

SPECIFICATION forming part of Letters Patent No. 410,585, dated September 10, 1889.

Application filed March 28, 1889. Serial No. 305,139. (No model.)

*To all whom it may concern:*

Be it known that I, JAMES CRAWFORD FERGUSON, a subject of the Queen of Great Britain, residing at Belton, in the county of Bell and State of Texas, have invented new and useful Improvements in Stone-Sawing Machines, of which the following is a specification.

My invention relates to improvements in stone-sawing machines; and it consists in certain novel features hereinafter described and claimed.

In the accompanying drawings, Figure 1 is a perspective view. Fig. 2 is an end view with a part in section on the lines $x\,x$ of Fig. 1. Fig. 3 is a side view with a part in section. Fig. 4 is a detail perspective view of the mechanism for rotating the saw-arbor.

Referring to the drawings by letter, A A designate the track or supporting rails, which are placed on the stone to be sawed parallel with each other and a proper distance apart to support the sawing-machine between them. These rails are substantially L-shaped in cross-section and have longitudinal ribs or flanges B on their inner sides, as shown, the said flanges having longitudinal grooves C in their upper faces, which receive the rollers on the carriage.

D designates the carriage, composed of the longitudinal side bars E and the cross-bars F, connecting the same and having the rollers G mounted on their outer sides and moving in the grooves C of the track-rails A. The steam-engine H is secured on the carriage at one end of the same, and is adapted to drive the saw. At a suitable point of the carriage I erect the standards I, and upon said standards, near their upper ends, I mount the crank-shaft J, having a band-pulley K at one end, which is connected by a belt L with a driving-pulley M on the driving-shaft of the steam-engine. The saw-arbor N is journaled in suitable bearings on the side bars of the carriage between the standards and the end of the carriage, and the saw O is secured thereon in the usual manner. The saw-arbor is provided on opposite sides of the saw with the ratchet-wheels P P, and these ratchet-wheels are engaged by the pawls Q, secured to the levers R, which are loosely mounted at one end on the saw-arbor and have their other ends connected by the pitmen R' with the crank-shaft J, as shown, so that as the said crank-shaft is rotated the levers will be vibrated and the ratchet-wheels fed forward, so as to rotate the saw-arbor. The bearings or journal-boxes 2 for the saw-arbor are supported by chairs 3, which are secured in recesses 4 in the side bars of the carriage, so that the saw will cut deep into the rock. The pawls Q are pivoted between plates 5, adjustably secured to the sides of the levers R, so that the said pawls can be brought as near as possible to their work.

S S designate eccentrics, which are secured on the saw-arbor beyond the ratchet-wheels, and are engaged by the outer ends of the pitmen T, the inner ends of which are pivoted in the vertical stirrups U, the said outer ends of the pitmen being provided with nuts, by which they can be adjusted to their work. The lower ends of these stirrups are pivoted to a bracket V, secured to one of the cross-bars F of the carriage, and they extend upward from said brackets above the cross-bar, as shown.

W W designate pawls, which are pivoted in the upper portions of the stirrups and engage ratchet-wheels X, secured on a transverse shaft Y, which is journaled upon the carriage D, and is provided at its ends with the pinions Z, which engage the longitudinal rack-bars $a$, and thereby move the carriage longitudinally upon the rails, so as to feed the saw forward as the stone is cut.

In practice the rails A are mounted on the stone to be sawed and the carriage then placed on the rails. The steam-engine is then started and the crank-shaft thereby rotated, as will be readily understood. As the said shaft rotates the pitmen S will be alternately raised and lowered, thereby vibrating the levers R, and consequently causing the pawls Q, carried by said levers and engaging the ratchet-wheels, to feed the said ratchet-wheels forward, so as to rotate the saw-arbor, and thereby drive the saw so as to cut the stone. The ratchet-wheels are so arranged that one of them will be fed forward at the same time that the other one is not engaged by its respective pawl, so that a continuous rotary motion will be imparted to the saw. The eccentrics S on the saw-arbor impart a vibratory motion to the pitmen T, and thereby oscillate the stirrups U, so as to cause the pawls W, engaging the ratchet-wheels X, to feed the said ratchet-wheels forward, and thereby rotate the shaft Y and the pinions Z, carried by said shaft. The machine will thus be caused to travel on the rails, so that the saw will be made to follow the kerf made in the stone.

From the foregoing description it will be seen that I have provided a stone-sawing machine which is composed of the fewest possible parts, and its advantages are thought to be obvious. The machine requires but little attention and automatically moves along the rails, so as to move the saw to its work. When the end of the block of stone has been reached, the pawls W are disengaged from the ratchet-wheels X, and the shaft Y then rotated in the contrary direction by means of the crank-arm *b* at the end of the same, so as to bring the carriage into position at the initial end of the track, as will be readily understood. The stirrups U are provided with a longitudinal series of transverse perforations, through which the pivot-pins of the pitmen T and pawl W are passed, so as to vary the length of stroke of the said pitmen and pawls, as will be readily understood. When it is desired to remove stone from the quarry, the machine is operated to saw the stone lengthwise of the quarry, and then made to saw it transversely, after which the blocks can be removed from the bottom in any desired manner. After the blocks have been removed they can be readily sawed to the desired size. In quarrying, when the ends of the rails have been reached, additional rails are placed in alignment therewith, so as to extend the track to the desired length. When sawing the blocks of stone into small sizes, the stone is moved under the carriage, one end of the same being supported on the solid rock and the pawls W being thrown out of engagement.

Having thus described my invention, what I claim, and desire to secure by Letters Patent, is—

1. In a sawing-machine, the combination of the carriage, the rotary saw-arbor journaled therein, the saw secured on said arbor, the ratchet-wheels secured on the saw-arbor on opposite sides of the saw, the levers R, having the plates 5 at their outer ends loosely mounted on the saw-arbor, the pawls pivoted between the plates 5, the crank-shaft arranged in rear of and above the saw-arbor, mechanism for rotating the crank-shaft, and the pitmen connecting the crank-shaft with the levers R, as set forth.

2. The combination, with the track-rails having the rack-bars *a*, of the carriage mounted on the track-rails, the transverse shaft Y on the carriage, the pinions Z on said shaft, engaging the rack-bars, the stirrups U, mounted on the carriage adjacent to the shaft Y, the ratchet-wheels X on said shaft Y, the pawls pivoted in the stirrups U and engaging the ratchet-wheels X, the pitmen pivoted to said stirrups and driven by the saw-arbor, and mechanism for rotating the saw-arbor, as set forth.

3. As an improvement in sawing-machines, the combination of the track-rails having the rack-bars *a* on their upper sides, the carriage mounted on the rails, the shaft Y on the carriage, provided at its ends with pinions engaging the rack *a*, the ratchet-wheels X on said shaft, the brackets V on the carriage adjacent to said shaft, the stirrups U, pivoted to said brackets, the pawls pivoted in said stirrups and engaging the ratchet-wheels X, the saw-arbor mounted in the carriage, the pitmen connecting the stirrups U with the saw-arbor, the ratchet-wheels P on the saw-arbor, the crank-shaft above and in rear of the saw-arbor, the levers R, loosely mounted on the saw-arbor, the pawls on said levers engaging the ratchet-wheels P, the pitmen connecting said levers with the crank-shaft, and mechanism for rotating the crank-shaft, as specified.

In testimony that I claim the foregoing as my own I have hereto affixed my signature in presence of two witnesses.

JAMES CRAWFORD FERGUSON.

Witnesses:
J. L. DOCKUM,
J. W. COVINGTON.